United States Patent
Spahr et al.

(10) Patent No.: US 9,862,452 B2
(45) Date of Patent: Jan. 9, 2018

(54) QUICK RELEASE

(71) Applicant: DT SWISS INC., Grand Junction, CO (US)

(72) Inventors: Stefan Spahr, Lengnau (CH); Jerome Hoffmann, Pieterlein (CH)

(73) Assignee: DT SWISS INC., Grand Junction, CO (US)

( * ) Notice: Subject to any disclaimer, the term of this patent is extended or adjusted under 35 U.S.C. 154(b) by 109 days.

(21) Appl. No.: 14/464,992

(22) Filed: Aug. 21, 2014

(65) Prior Publication Data
US 2015/0054254 A1     Feb. 26, 2015

(30) Foreign Application Priority Data

Aug. 22, 2013  (DE) .......................... 10 2013 013 819

(51) Int. Cl.
*B62K 25/02*  (2006.01)
*B60B 27/02*  (2006.01)

(52) U.S. Cl.
CPC ............ *B62K 25/02* (2013.01); *B60B 27/026* (2013.01); *B62K 2206/00* (2013.01); *Y10T 403/595* (2015.01)

(58) Field of Classification Search
CPC .. B60L 27/026; B62K 25/02; B62K 2025/025
See application file for complete search history.

(56) References Cited

U.S. PATENT DOCUMENTS

| | | | | |
|---|---|---|---|---|
| 7,494,145 B2 | 2/2009 | Schroeder et al. | | |
| 8,113,529 B2* | 2/2012 | Spahr | .................... | B62K 25/02 280/276 |
| 8,696,213 B2* | 4/2014 | Spahr | .................... | B60B 27/026 301/110.5 |
| 9,010,875 B2* | 4/2015 | Spahr | .................... | B60B 27/047 301/110.5 |
| 9,370,968 B2* | 6/2016 | Spahr | .................... | B60B 27/023 |
| 2008/0185907 A1* | 8/2008 | Hara | .................... | B60B 27/026 301/111.03 |
| 2009/0102276 A1* | 4/2009 | Mercat | .................... | B62K 25/02 301/124.2 |
| 2009/0230653 A1* | 9/2009 | Spahr | .................... | B62K 25/02 280/276 |
| 2009/0274406 A1* | 11/2009 | Spahr | .................... | B60B 27/026 384/545 |

(Continued)

FOREIGN PATENT DOCUMENTS

WO     2008/145496     12/2008

*Primary Examiner* — Kip T Kotter
(74) *Attorney, Agent, or Firm* — Greer, Burns & Crain, Ltd.

(57) ABSTRACT

A quick release mechanism for at least partially muscle-powered two-wheeled vehicles such as bicycles having a through axle extending in the axial direction, a clamping device at a first end of the through axle and a fastener at the second end of the through axle and with a clamping mechanism for clamping the clamping device. The clamping device includes an engaging section for applying a clamping force from the clamping mechanism to the clamping device and a clamping section with an annular pressure area for clamping. The clamping device has a tubular mounting section extending from the clamping section in the direction of the second end of the through axle and to which the through axle is attached.

15 Claims, 2 Drawing Sheets

(56) References Cited

U.S. PATENT DOCUMENTS

| | | | |
|---|---|---|---|
| 2011/0278912 A1* | 11/2011 | Schlanger | B62K 25/02 301/124.2 |
| 2011/0309671 A1* | 12/2011 | Achenbach | B62K 25/02 301/124.2 |
| 2012/0161503 A1* | 6/2012 | Achenbach | B62K 25/02 301/124.2 |
| 2013/0119633 A1 | 5/2013 | Klieber | |
| 2014/0265227 A1* | 9/2014 | Voss | B60B 27/026 280/281.1 |

* cited by examiner

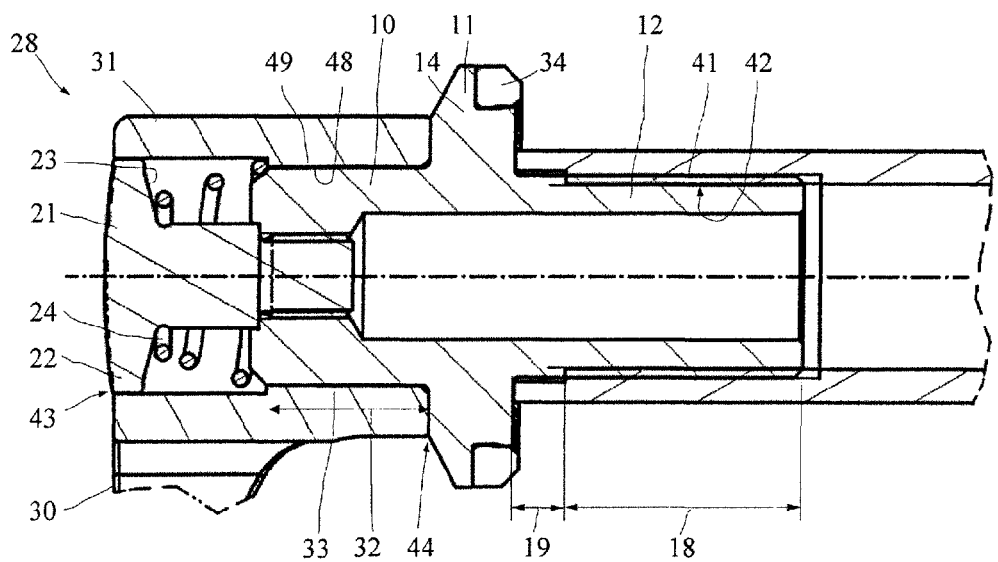
Fig. 4
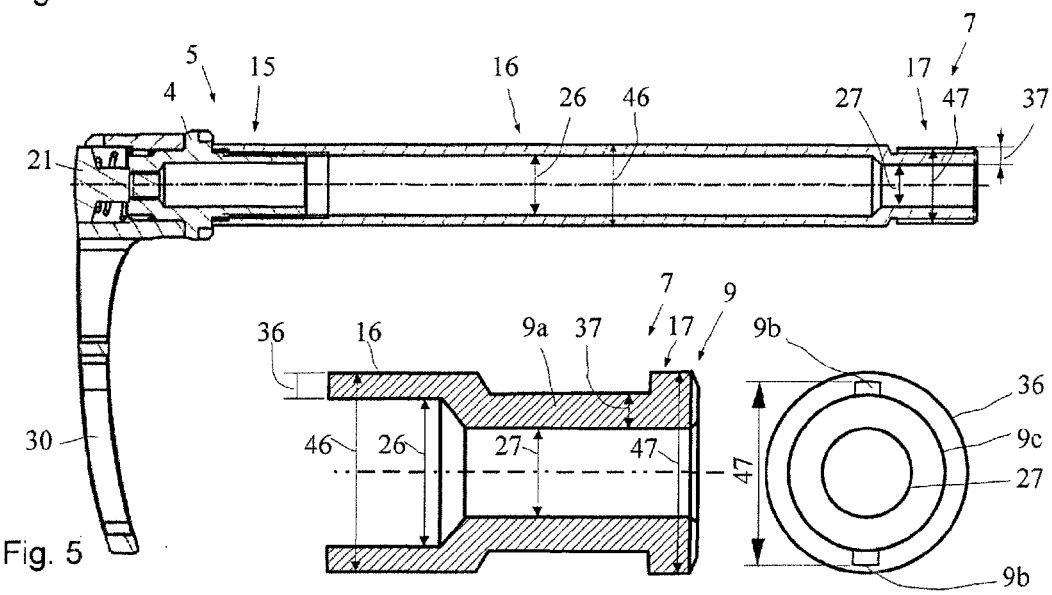
Fig. 5
Fig. 8A
Fig. 8B
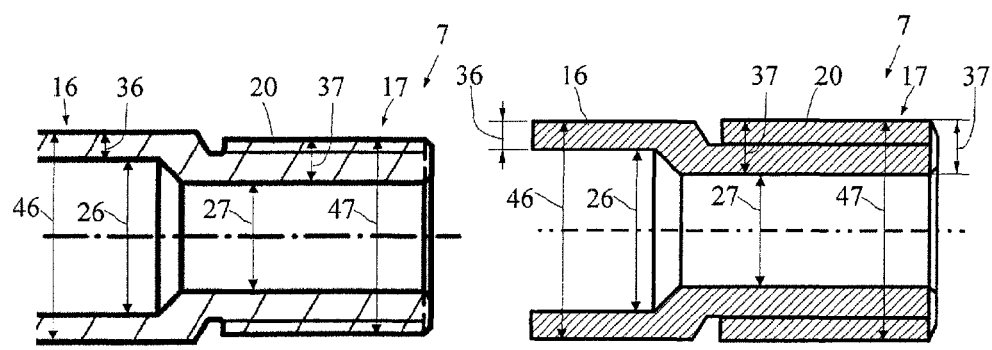
Fig. 6
Fig. 7

QUICK RELEASE

BACKGROUND

The present invention relates to a quick release mechanism, in particular for at least partially muscle-powered two-wheeled vehicles such as bicycles.

The quick release mechanism according to the invention can be employed both with a front wheel hub and a rear wheel hub. The quick release mechanism comprises a through axle, and it is thus suitable for hubs comprising a hub shell receiving a bearing in a bearing seat at both of its ends. When mounting the quick release mechanism, the through axle is inserted into the hub through the inner bearing ring on one side, as a rule passing through a spacer between the two bearings, and finally it is passed through the inner bearing ring on the other side where it is screwed to the frame or the fork.

Most quick releases show a clamping mechanism at one end and, at the other end, an external thread on the through axle by means of which the through axle is screwed into a dropout of the frame or the fork.

Known quick releases with through axles provide for the threaded free end to be screwed into the associated dropout, and the other end is provided with a clamping pad which is urged against the other dropout, thus achieving the clamping as the quick release is closed. To connect the clamping pad with the through axle, a steel pin is screwed into the clamping pad so that one externally threaded free end still protrudes out of the clamping pad. Thereafter, the hollow through axle is screwed onto this finger protruding from the clamping pad to connect the clamping pad to the through axle.

This quick release operates reliably and allows to reproducibly apply the required forces. Its disadvantage is the comparatively high weight. With bicycles for sports, however, every gram of weight counts.

SUMMARY

It is therefore the object of the present invention to provide a quick release mechanism which enables a reliable function and has a low weight.

A quick release mechanism according to the invention is in particular provided for at least partially muscle-powered two-wheeled vehicles such as bicycles, and comprises a through axle extending in an axial direction, a clamping device at the first end of the through axle, and a fastener at a second end of the through axle. Furthermore, a clamping mechanism for clamping the clamping device is provided. The clamping device comprises an engaging section for applying a clamping force of the clamping mechanism to the clamping device, and a clamping section with a pressure area that is in particular annular, for clamping. The clamping device is furthermore provided with a tubular mounting section extending from the clamping section in the direction of the second end of the through axle. The through axle is fastened to the mounting section.

The quick release mechanism according to the invention has many advantages because it allows a reduced weight while offering high operational reliability. The mounting section forming part of the clamping device allows to save considerable weight since the separate steel pin can be omitted. The entire clamping device may be manufactured of a light material such as lightweight material, light metal, fibrous composite material, carbon or the like. A combination of different materials is likewise possible.

The mounting section may be configured as a mounting finger and may be tubular, sleeve-like, or cylindrical in shape.

In all the configurations, the clamping mechanism serves for clamping the clamping device and it can in particular be moved to a first and at least one second, axial position. In the first axial position, also referred to as the engaging position, the clamping mechanism is in particular non-rotatably connected with or coupled to the clamping device. At least in the second axial position, also referred to as the rotary position, the clamping mechanism can rotate relative to the clamping device and can in particular rotate freely.

Preferably the clamping device comprises an integral clamping body provided with the engaging section, the clamping section, and the mounting section. Preferably the engaging section, the clamping section, and the mounting section are adjacent to one another in the axial direction each.

In all the configurations, it is preferred at least for the first end of the through axle to be configured hollow. In particular is the through axle configured hollow at least in sections and it is preferably provided hollow over its entire length. In advantageous specific embodiments, the first end of the through axle radially surrounds the mounting section. Particularly preferably, the through axle is pushed on or for example screwed onto the mounting section. The through axle is fastened to the mounting section of the clamping device by its hollow, first end. The required stability under load is provided by way of the through axle being fastened to the mounting section of the clamping device. It is also possible and preferred for the through axle to be glue-bonded with the mounting section and preferably it is additionally fastened or secured by way of form-fit.

It is also preferred for the first end of the through axle to be radially surrounded by the mounting section. In the case of this configuration, the first end of the through axle is for example screwed or inserted into the mounting section. For example, the outer surface of the through axle may be threaded at its first end by means of which the first through axle end is screwed into the clamping device to fixedly connect the two parts with one another. In particularly preferred specific embodiments, the through axle is put onto the mounting section of the clamping device where it is fastened.

In preferred specific embodiments, the through axle is screw-coupled with the mounting section and in particular screwed onto the mounting section.

In all the configurations, it is also preferred for the through axle to be glue-bonded with the mounting section. It is possible and preferred for the through axle to first be screwed with the mounting section while a glue or a multi-component adhesive is applied to the threads to be cured following the screwing so as to secure the screw connection against inadvertent unscrewing.

Or else it is possible for the connection between the through axle and the clamping device to be adhesive-based at least in part or else entirely. It is preferred for the mounting section to be provided with an in particular cylindrical gluing section and adjacent thereto, a guiding section. The guiding section is in particular disposed adjacent to the clamping section. Within the guiding section, the difference in diameters between the through axle and the mounting section is less than is the difference in diameters between the through axle and the mounting section at the gluing section. This results in providing within the gluing section a certain radial tolerance or a certain radial volume for receiving the adhesive so as to ensure an efficient and highly stress-resistant gluing point. The guiding section provides for a fitted alignment of the components relative to one another.

In all the configurations, it is particularly preferred for the clear inner diameter of the through axle to be larger in a central region than in a region at the second end. This construction allows a particularly lightweight though sturdy configuration, since the inner diameter of the central region is enlarged which results in a reduced overall weight of the through axle and the quick release mechanism. The region of the second end may be provided with a reduced inner diameter so as to result in a more robust section of the through axle in this point. Optimizing can be done so that the specified stability under load is maintained so that the total weight can be reduced on the whole.

Therefore, the through axle preferably shows a larger clear inner diameter in a region at the first end than it does in a region at the second end. It is possible and preferred for the clear inner diameter of the through axle to be reduced in the region of the second end only while the first end and the central region show a largely constant inner diameter.

Preferably, the through axle shows a smaller wall thickness in a central region than at the fastener and/or in a region at the second end. Due to the fact that the through axle shows a sufficiently large wall thickness at the fastener, since this is where the highest stresses occur the wall thickness can be thinner in a central region of the through axle.

Preferably the through axle shows an outer diameter that is smaller in a region at the second end than in a central region. For example, the outer diameter may be approximately 15 mm in a central region while it is only 14.5 mm at the second end. An outer diameter that is somewhat reduced for example by 3% or 5% or 10% in the region of the fastener at the second end allows greater ease of inserting the through axle into a dropout of a two-wheeled vehicle or bicycle.

In all the configurations, it is particularly preferred for the through axle to be externally threaded at the second end to provide a fastener. The externally threaded fastener is in particular provided to screw into an internal thread of a dropout. Or else it is possible for the external thread to be provided to be screwed with a separate screw nut.

Preferably, the clamping device comprises a push button having a circumferential collar. The collar forms a counter bearing for a spring device which biases the clamping mechanism to an engaging position with the engaging section. By way of holding the push button down and pulling the clamping mechanism, the clamping mechanism can then be pulled out a little bit in the axial direction so as to disengage the engaging section from the clamping device. In this position, the clamping mechanism can rotate freely relative to the clamping device. It is preferred for the collar to guide the clamping lever so as to keep the clamping lever from tilting.

In advantageous specific embodiments, the clamping mechanism has a lever for applying the clamping force and a clamping sleeve where the transmitting section for transmitting the clamping force is provided. The transmitting section transmits the clamping force to an engaging section of the clamping device. The lever is disposed on the whole movable relative to the clamping device in the axial direction of the through axle and it can be moved outwardly in the axial direction of the through axle counter to the bias of a spring device from an engaging position to a rotary position in which an angular position of the lever is adjustable independently of the clamping state. The spring device acts as a biasing spring.

A bicycle component according to the invention comprises a supporting device and a quick release mechanism as it has been described above. The supporting device comprises take-up openings to receive the quick release mechanism and comprises at least one fastener accommodation in at least one take-up opening of the supporting device to fasten the fastener to the supporting device in this spot.

The fastener accommodation may be configured as, or comprise, a thread wherein the thread of the fastener accommodation is screwed with the threaded fastener. The fastener accommodation may, for example comprise an internal thread into which an external thread of the fastener is screwed. It is also possible for the fastener to comprise an internal thread into which a screw can be screwed which when it is screwed in is retained by the fastener accommodation.

It is also possible for the fastener to comprise a bayonet joint. It is likewise preferred for the fastener to comprise one, two, or more radially projecting pegs, teeth, or fastening units which are guided through the fastener accommodation at the dropout in an angular position while they cannot be pulled out axially in at least one angular position. This configuration may be structured similar to a key/keyhole system where the fastener ("key") with the at least one radially protruding fastening unit ("key bit") can be inserted into the fastener accommodation ("keyhole") in an angular position. In at least one other angular position, the fastener ("key") is retained at the fastener accommodation ("keyhole") by means of at least one radially protruding fastening unit ("key bit"). The fastener preferably comprises a main body from which the fastening units protrude radially outwardly. The orientation of the fastening units may comprise a tangential component in addition to the radial component. The main body of the fastener may be smaller in its outer diameter for the fastener or the fastening units of the fastener to not protrude radially beyond the outer diameter of the through axle. Then the fastening units extending radially outwardly from the main body can remain within the outer diameter of the fastener. In preferred configurations the supporting device comprises a fork and/or dropouts for receiving the quick release mechanism.

BRIEF DESCRIPTION OF THE DRAWINGS

Further advantages and properties of the present invention can be taken from the description of the exemplary embodiments which will be described below with reference to the enclosed figures.

The figures show in:

FIG. 4 an enlarged detail from the cross section according to FIG. 3;

FIG. 5 a different embodiment of a quick release mechanism according to the invention;

FIG. 6 an embodiment variant of the second end of the through axle of the quick release mechanism according to FIG. 5;

FIG. 7 another embodiment variant of the second end of the through axle of the quick release mechanism according to FIG. 5;

FIG. 8A is a partial cross-section view of another embodiment variant of the second end of the through axle of the quick release mechanism substantially along line 8A-8A in the direction generally indicated in according to FIG. 5; and FIG. 8B is an end view of the embodiment of FIG. 8A.

DETAILED DESCRIPTION

Figure 1:
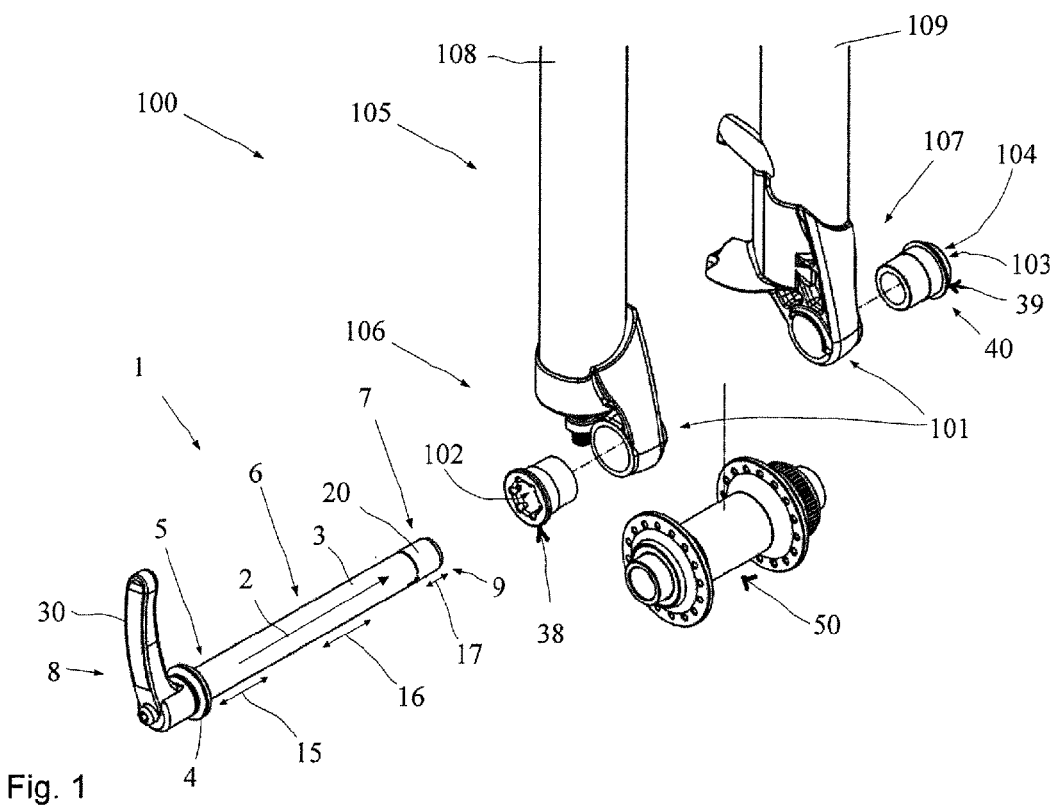
FIG. 1 an exploded, perspective view of a bicycle component with a quick release mechanism according to the invention.

FIG. 1 illustrates an exploded view of an exemplary embodiment of a bicycle component 100 according to the invention with an inventive quick release mechanism 1.

The bicycle component 100 comprises a bicycle fork 105 shown partially and having two legs 108 and 109. The fork 105 may optionally be configured as a suspension fork so that the legs 108, 109 each comprise an outer tube (slider tube) and an inner tube (stanchion tube).

The lower ends of the legs 108, 109 of the fork 105 are provided with dropouts 106, 107 which are provided with take-up openings 102, 103 for receiving and fastening the quick release mechanism 1 to the through axle 3.

The quick release mechanism 1 serves to quickly and easily mount a bicycle wheel to a frame or in the fork requiring no tool but providing adequate clamping force. To this end, the hub 50 of the wheel is received at and secured to the bicycle component 100.

The quick release mechanism 1 comprises a clamping mechanism 8 with a lever 30 for applying the clamping force, and a through axle 3 extending through the wheel axle in operation, and a fastener accommodation 40 in the shape of a sleeve 39 or an end piece.

Prior to mounting, sleeves 38, 39 are inserted into the dropouts 106, 107 which sleeves are exchangeable and can thus be readily changed in the case of damage. The sleeve 39 comprises a take-up opening 103 having an internal thread 104.

For mounting, the hub 50 is inserted between the legs 108, 109 and the through axle is first passed by its second end 7 through the take-up opening 102 at the sleeve 38 in the leg 108 of the fork 105, continuing through the interior of the hub 50 until the region 17 at the second end 7 of the through axle 3 has been inserted into the take-up opening 103 of the sleeve 39. The sleeve 39 is provided with an internal thread 104 into which the external thread 20 at the second end 7 of the through axle 3 is screwed. The sleeve 39 serves as a fastener accommodation 40 and for fastening the fastener 9.

The lever 30 rotates along during screwing in, providing an effective grip.

FIG. 1 illustrates that the through axle 3 comprises a first region 15 at the first end 5, a central region 16 in the center 6, and a region 17 at the second end 7.

Figure 2:
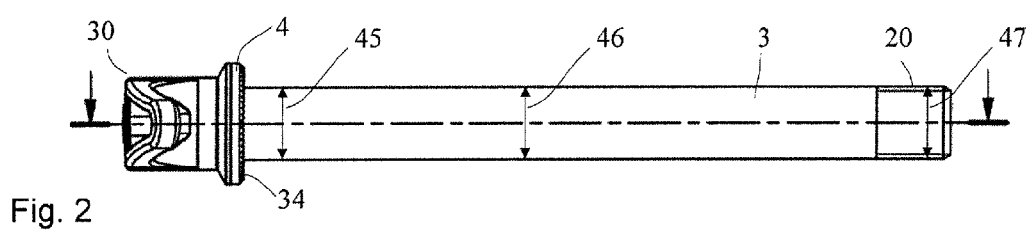
FIG. 2 a top view of the quick release mechanism according to FIG. 1.

In the illustration in FIG. 2, the outer diameter 45 in the region 15 is the same size as is the outer diameter 46 in the region 16. The outer diameter 47 at the external thread 20 in the region 17 at the second end 7 may likewise be the same as are the outer diameters 45 and 46. The external thread 20 may e.g. be M14 or M15.

Figure 3:
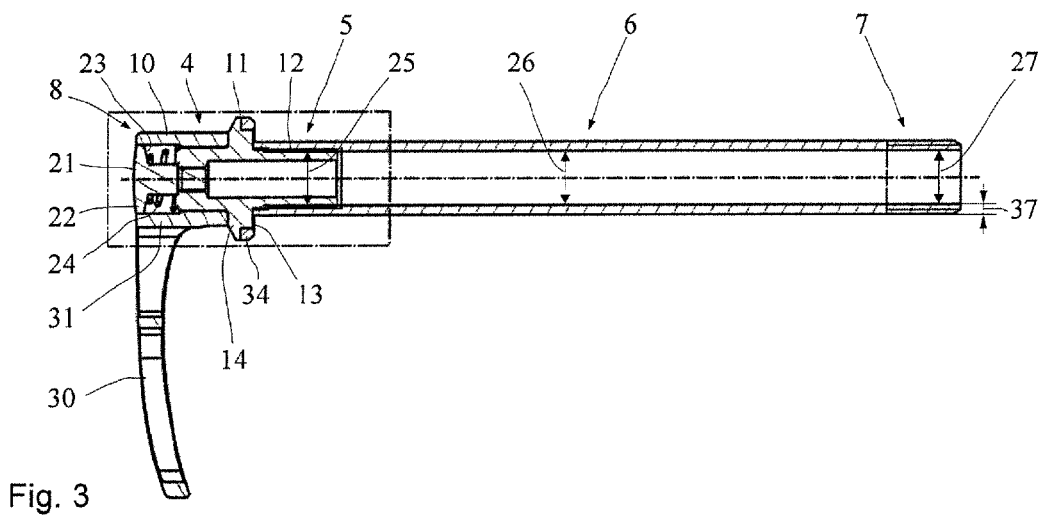
FIG. 3 a cross section of the quick release mechanism according to FIG. 2.

FIG. 3 shows a cross section of the quick release mechanism 1 according to FIG. 2. It can be seen that the first end 5 is provided with a lever 30 for applying the required clamping force. The through axle 3 is screwed by its first end 5 onto the mounting section 12 of the clamping device 4 where it is additionally glued on.

The mounting section 12 is manufactured integrally with the clamping section 11 and the engaging section 10 of the clamping device 4. The mounting section 12 extends finger-like from the clamping section 11 in the axial direction toward and into the through axle 3. The inner diameter 25 of the through axle 3 in the region 15 of the first end 5 is the same size as is the inner diameter 26 in the central region 16.

The clamping section 11 is provided with a pressure area 13. It is possible for the pressure area 13 to act directly on, and abut, e.g. the fork. The clamping section comprises a knurled disk 34 which in the clamped condition abuts against the leg 108 of the fork 105 or against the axial outer surface of the sleeve 38, thus effectively transmitting the applied pressure. Force is thus transmitted from the pressure area 13 via the knurled disk 34 to the bicycle component 100.

One can clearly recognize the push button 21 which serves as a back rest when the lever 30 is pulled toward the first end 5 for disengaging the clamping mechanism 8. By pulling the lever 30 the spring device 24 is compressed to serve as a biasing device. The circumferential collar 22 of the push button 21 serves as a counter bearing for the spring device 24 and additionally serves as a guide when the lever 30 is axially pulled outwardly for clamping or releasing the quick release mechanism 1. The force of the spring device 24 serves to automatically reset the lever 30 to the home position.

In the section according to FIG. 3, the inner diameter 25 corresponds to the inner diameter 26 and also to the inner diameter 27. The wall thickness 37 is also the same in all the regions.

FIG. 4 shows an enlarged detail from FIG. 3. The clamping device 4 is illustrated in section. One can recognize that the clamping device 4 comprises an integral clamping body 14. The clamping body 14 consists of a light metal such as aluminum or an aluminum alloy or similar light metals or lightweight materials.

The clamping force of the quick release mechanism 1 is independent of the clamping force of the spring device 24. For increasing the clamping force of the quick release mechanism 1, the clamping device 4 is rotated by way of a rotary motion and by the external thread 20 it is screwed further into the sleeve 39 having an internal thread 104 or into the fastener accommodation 40.

In the position shown in FIG. 4 and also in FIG. 5, the lever 30 and the clamping device 4 are in the engaging position 28. In this position, a rotation of the clamping device 4 can increase or decrease the clamping force in relation to the direction of rotation.

The radial gap 43 between the outer diameter of the push button 21 and the inner diameter of the clamping sleeve 31 is small and it is preferably less than 1 mm and in particular less than 0.5 mm and particularly preferably less than 0.25 mm. In this way the interior and thus the toothings 48 and 49 are reliably and effectively protected from dirt entering from outside and a particularly reliable operation is ensured.

When the lever 30 and along with it, the clamping device 4 is pulled axially outwardly over the length 32, the toothings 48 and 49 disengage, and the lever 30 can be freely displaced to any desired angular position. After releasing, the clamping lever 30 with the clamping sleeve 31 once again moves axially toward the clamping section 11 due to the biasing force of the spring device 24. The external toothing 48 once again engages with the internal toothing 49 and the angular position of the clamping lever 30 is fixed.

The lever 30 can be positioned in one step with clamping or tightening without affecting the seat of the wheel. This is advantageous over the quick release system with an eccentric member known from the prior art.

The usual eccentric quick release systems provide for building up the clamping force, following presetting the clamping length by way of nut and stopper on a thread, by way of folding down an eccentric member. The clamping length must first be preset. As a rule, this is done by iteration until the applied clamping force corresponds to the intended clamping force when folding down the eccentric member. For resetting the eccentric member to the desired angular position, the eccentric member must then be folded down once again, i.e. the wheel must be released. These surplus steps are awkward and time-consuming for riders who—as it is quite normal—wish to check the clamping force during a ride (e.g. prior to a downhill stretch).

In eccentric quick release systems, the wheel must be removed which may cause changes to the installed situation of the brakes (both rim brakes and disk brakes) and the gear shift device. Thereafter, the eccentric member must be folded down once again. If the clamping distance is too narrow, then the clamping length must be corrected, i.e. the wheel must once again be removed.

In the present system, only the clamping force requires checking. The lever 30 or clamping lever can be retightened without removing the quick release mechanism 1. In case that—contrary to expectations—the clamping force is too small then checking goes along with any corrections.

Applying the clamping force requires a small number of components and preferably metal components only. Thus, the clamping force is hardly affected by external conditions (time, temperature), unlike with solutions involving plastic parts in the force flow which are required for example to minimize the frictional force when folding down the eccentric member.

In eccentric quick release systems, the time factor may result in settling of plastic parts within the force flow, i.e. it may cause changes to the clamping length and thus to the clamping force which in the worst case may result in system failure.

In this system, the clamping force builds up and is maintained by tightening the clamping lever 30.

The clamping lever 30 and the clamping sleeve 31 preferably consist of a fiber-reinforced plastic. An axial internal toothing 49 is provided on the inner periphery within the clamping sleeve 31 which is pressed closed by force-fit by an axially acting spring device 24 in particular in the shape of a coil spring, toward the clamping device 4 wherein the internal toothing 49 of the clamping sleeve 31 comes into form-fit engagement with the external toothing 48 of the clamping device 4. The clamping device 4 is screwed and/or glue-bonded with the through axle.

An axial air gap 44 may be provided axially between the clamping sleeve 31 and the clamping section 11 of the clamping body 14 to cause thermal decoupling.

When the pressure force of the spring device 24 is overcome manually, then the axial lift of the lever 30 allows adjustment of the angle of the lever 30 according to the installed situation or the rider's preferences. As adjustments are finished, the lever 30 is released and the spring device 24 relocks the quick release lever 30 without affecting the angular position.

The knurled disk 34 is rotatable relative to the clamping device 4 so that the knurled disk 34 will not eat into the frame or the fork or the sleeve 39.

A considerable advantage is that operation of the system is remarkably simple. Dangerous operational errors which are often observed in other systems can be largely avoided since most users can comprehend this system more readily than they would the building up of the clamping force by way of varying the clamping length followed by folding down an eccentric member.

Mounting a wheel is remarkably simple with the new system. After pushing the through axle through the hub, the clamping lever is rotated in the right direction to tighten the axle. If the installed situation prohibits rotating the lever 360°, rotation may be done as with a ratchet. Thereafter the lever 30 is pulled outwardly, rotated to the desired position, and released.

The clamping body 14 comprises the engaging section 10 by way of which the lever 30 applies the clamping force. The clamping body 14 furthermore comprises the clamping section 11 which is urged against the dropout 106 to firmly receive a hub. Finally the clamping body 14 comprises the mounting section 12 which extends finger-like away from the clamping section 11. The mounting section 12 is configured in particular hollow, presently tubular, having an external thread 42 onto which the internal thread 41 at the first end 5 of the through axle 3 is screwed.

The thread 42 extends along the gluing section 18 where additional adhesive is applied to the thread to permanently and securely connect the through axle 3 with the clamping device 4. The section 18 is followed by the section 19 which serves as a guiding section, extending up to the through axle 3 for optimal alignment of the clamping device 4.

The clamping body 14 is provided with the engaging section 10 where the clamping device 4 comprises a radial toothing in the shape of an external toothing 48 along the transmitting section 32. A matching internal toothing 49 is provided in the clamping sleeve 31 preferably over the same length. When the external toothing 48 of the transmitting section 32 of the clamping body 14 is engaged in the internal toothing 49 of the engaging section 33, this is a non-rotatable connection between the lever 30 and the through axle 3 and the quick release mechanism can be tightened further or else released by rotating the lever 30 to one—or the other—direction.

Pulling the lever 30 axially outwardly counter to the force of the spring device 24, then the toothings 48 and 49 disengage from one another so that the lever 30 can rotate freely without affecting the clamped state of the quick release mechanism 1. This enables comfortable operation of the quick release mechanism.

FIG. 5 shows another embodiment where the clamping device 4 with the lever 30 and the clamping mechanism 8 are configured identical to those described above.

Unlike in the preceding exemplary embodiment, the outer diameter 47 of the through axle 3 is different in the region 17 at the second end 7. Moreover the wall thickness 37 in the region 17 at the second end 7 is considerably larger than the wall thickness 36 in the central region 16. This allows a wall thickness 37 that is larger and adapted in the region 17 at the second end 7 to withstand the stresses occurring there.

The wall thickness 36 of the through axle 3 can be reduced in the central region 16 or in the region 15 at the first end 5 of the through axle 3 so that the total weight can be reduced on the whole.

FIG. 6 shows an enlarged cross section of the second end 7 of the through axle device 1. The inner diameter 27 in the region at the second end 7 is smaller than is the inner diameter 26 in a central region 16 of the through axle 3. The wall thickness 35 in the first region 15 is also smaller than is the wall thickness 37 in the region 17 at the second end 7.

These measures provide an advantageous quick release mechanism 1 for easy assembly and easy maintenance showing a low weight and high stability while the functions are comparable or improved.

FIG. 7 shows a modification of the embodiment according to FIG. 6 with FIG. 7 having an outer diameter 47 in the region 17 at the second end 7 that is identical with the outer diameter 46 in the central region 16. However, the wall thickness 37 in the region 17 at the second end 7 is again larger than the wall thickness 36 in the central region 16. Accordingly the inner diameter 27 is smaller at the second end 7 in the region 17 than is the inner diameter 26 in the central region.

FIG. 8 shows another embodiment variant of the second end 7 of the through axle 3 of the quick release mechanism 1 according to FIG. 5 in a longitudinal section and in a side view when viewed from the second end. The inner diameter 27 in the region 17 at the second end 7 is again smaller than is the inner diameter 26 in a central region 16 of the through axle 3. The wall thickness 37 in the region 17 at the second end 7 is again larger than the wall thickness 36 in the central region 16.

At the second end 7 one can recognize the fastener 9 which comprises a cylindrical main body 9a having an outer diameter 9c that is smaller than the outer diameter 36 in the central region 16. A pair of fastening units 9b extend radially outwardly from the main body 9a which units are configured as radial pins, pegs or the like. The maximum radial extension or the maximum outer diameter 47 at the fastening units 9b is less than or equal to the outer diameter 36 in the central region 16.

A matching cylindrical accommodation with recesses for inserting the fastening units 9b is used for fastener accommodations. After inserting the fastening units 9b the main body 9a with the through axle is rotated e.g. 90° so that the fastening units are supported at the fastener accommodations. On the whole the invention provides an advantageous quick release mechanism for through axles which can be used both for rear wheels and for front wheels. The quick release may be simple in construction while being designed particularly lightweight and particularly robust.

| List of reference numerals: | |
|---|---|
| 1 | quick release mechanism |
| 2 | axial direction |
| 3 | through axle |
| 4 | clamping device |
| 5 | first end |
| 6 | center |
| 7 | second end |
| 8 | clamping mechanism |
| 9 | fastener |
| 9a | main body |
| 9b | fastening unit |
| 9c | outer diameter |
| 10 | engaging section |
| 11 | clamping section |
| 12 | mounting section |
| 13 | pressure area |
| 14 | clamping body |
| 15 | region at the 1st end |
| 16 | central region |
| 17 | region at the 2nd end |
| 18 | gluing section |
| 19 | guiding section |
| 20 | external thread |
| 21 | push button |
| 22 | collar |
| 23 | counter bearing |
| 24 | spring device |
| 25 | inner diameter |
| 26 | inner diameter |
| 27 | inner diameter |
| 28 | engaging position |

-continued

| List of reference numerals: | |
|---|---|
| 29 | rotary position |
| 30 | lever |
| 31 | clamping sleeve |
| 32 | transmitting section |
| 33 | engaging section |
| 34 | knurled disk |
| 35 | wall thickness |
| 36 | wall thickness |
| 37 | wall thickness |
| 38 | sleeve |
| 39 | sleeve |
| 40 | fastener accommodation |
| 41 | internal thread |
| 42 | external thread |
| 43 | radial gap |
| 44 | axial gap |
| 45 | outer diameter |
| 46 | outer diameter |
| 47 | outer diameter |
| 48 | external toothing |
| 49 | internal toothing |
| 50 | hub |
| 100 | bicycle component |
| 101 | supporting device |
| 102 | take-up opening |
| 103 | take-up opening |
| 104 | internal thread |
| 105 | fork |
| 106 | dropout |
| 107 | dropout |
| 108 | leg |
| 109 | leg |

The invention claimed is:

1. A quick release mechanism for at least partially muscle-powered two-wheeled vehicles, comprising:
   a through axle extending in an axial direction;
   a one-piece clamping device at a first end of the through axle and having a clamping sleeve with an inner surface with internal toothing, said clamping device having an integral clamping body with an engaging section, a clamping section, and a tubular mounting section;
   a fastener at a second end of the through axle; and
   a clamping mechanism for clamping the clamping device, said engaging section configured for applying a clamping force from the clamping mechanism to the clamping device, said engaging section including external toothing, and said clamping section having a pressure area for clamping, said tubular mounting section including a wall transversely extending from an end of the clamping section in the direction of the second end of the through axle and to which the through axle is attached,
   wherein when said clamping mechanism is moved relative to the axle, the external toothing of the engaging section disengages from the internal toothing of the clamping sleeve to enable a tightening torque to be transmitted from the clamping mechanism to the axle while maintaining the clamping force.

2. The quick release mechanism according to claim 1, wherein the through axle is configured hollow at least at the first end.

3. The quick release mechanism according to claim 1, wherein the first end of the through axle radially surrounds at least part of the mounting section.

4. The quick release mechanism according to claim 1, wherein the through axle is screw-coupled with the mounting section.

5. The quick release mechanism according to claim 1, wherein the through axle is glue-bonded with the mounting section.

6. The quick release mechanism according to claim 1, wherein the mounting section is provided with a cylindrical gluing section, and a guiding section is provided adjacent to the clamping section.

7. The quick release mechanism according to claim 1, wherein the through axle has a clear inner diameter that is larger in a central region than in a region at the second end.

8. The quick release mechanism according to claim 1, wherein the through axle has a clear inner diameter in a region at the first end that is larger than in a region at the second end.

9. The quick release mechanism according to claim 1, wherein the through axle has a wall thickness in a central region that is smaller than at the fastener.

10. The quick release mechanism according to claim 1, wherein the through axle has an outer diameter in a region at the second end that is smaller than in a central region.

11. The quick release mechanism according to claim 1, wherein the through axle has an external thread at the second end for the fastener.

12. The quick release mechanism according to claim 1, wherein the clamping device has a push button with a circumferential collar attached to it which collar forms a counter bearing for a spring device which biases the clamping mechanism to an engaging position with the engaging section.

13. A bicycle component having a supporting device and the quick release mechanism according to claim 1 wherein the supporting device comprises take-up openings for receiving the quick release mechanism and comprises at least one fastener accommodation at least at one take-up opening of the supporting device for attaching the fastener to the fastener accommodation of the supporting device.

14. The bicycle component according to claim 13, wherein the supporting device comprises a fork and/or dropouts for receiving the quick release mechanism.

15. A quick release mechanism for at least partially muscle-powered two-wheeled vehicles, comprising:
   a through axle extending in an axial direction;
   a one-piece clamping device at a first end of the through axle and having a clamping sleeve with an inner surface with internal toothing, said clamping device having an integral clamping body with an engaging section, a clamping section, and a tubular mounting section;
   a fastener at a second end of the through axle; and
   a clamping mechanism for clamping the clamping device, said engaging section configured for applying a clamping force from the clamping mechanism to the clamping device, said engaging section including external toothing, and said clamping section having a pressure area for clamping, said tubular mounting section extending from the clamping section in the direction of the second end of the through axle and to which the through axle is attached, said tubular mounting section having a length and defining a through-hole that extends the entire length of said tubular mounting section,
   wherein when said clamping mechanism is moved relative to the axle, the external toothing of the engaging section disengages from the internal toothing of the clamping sleeve to enable a tightening torque to be transmitted from the clamping mechanism to the axle while maintaining the clamping force.

* * * * *